(12) United States Patent
Lee

(10) Patent No.: US 8,913,616 B2
(45) Date of Patent: Dec. 16, 2014

(54) SYSTEM-ON-CHIP-BASED NETWORK PROTOCOL IN CONSIDERATION OF NETWORK EFFICIENCY

(75) Inventor: Chan-Ho Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 198 days.

(21) Appl. No.: 13/640,310

(22) PCT Filed: Oct. 22, 2010

(86) PCT No.: PCT/KR2010/007267
§ 371 (c)(1),
(2), (4) Date: Oct. 9, 2012

(87) PCT Pub. No.: WO2011/126190
PCT Pub. Date: Oct. 13, 2011

(65) Prior Publication Data
US 2013/0028261 A1 Jan. 31, 2013

(30) Foreign Application Priority Data

Apr. 9, 2010 (KR) .......................... 10-2010-0032697

(51) Int. Cl.
*H04L 12/28* (2006.01)
*G06F 13/42* (2006.01)
*G06F 15/78* (2006.01)

(52) U.S. Cl.
CPC ........ *G06F 13/4273* (2013.01); *G06F 15/7825* (2013.01)
USPC ........................................................ 370/392

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464, 497, 498–522, 370/523–520, 521–529
See application file for complete search history.

(56) References Cited

U.S. PATENT DOCUMENTS

| | | | | |
|---|---|---|---|---|
| 6,978,329 B1* | 12/2005 | Harral | | 710/116 |
| 2007/0115939 A1* | 5/2007 | Lee et al. | | 370/352 |
| 2007/0115995 A1* | 5/2007 | Kim et al. | | 370/392 |
| 2007/0147379 A1* | 6/2007 | Lee et al. | | 370/392 |
| 2007/0186018 A1* | 8/2007 | Radulescu et al. | | 710/100 |
| 2008/0086572 A1* | 4/2008 | Tune et al. | | 709/238 |
| 2008/0126569 A1* | 5/2008 | Rhim et al. | | 709/250 |
| 2010/0080229 A1* | 4/2010 | Scandurra et al. | | 370/392 |
| 2011/0026458 A1* | 2/2011 | Gruber et al. | | 370/328 |

* cited by examiner

*Primary Examiner* — Jung-Jen Liu
(74) *Attorney, Agent, or Firm* — William Park & Associates Patent Ltd.

(57) ABSTRACT

An SoC-based system network protocol in consideration of network efficiency is disclosed. An MSB of a command signal containing an instruction defining information that is contained in a transfer signal transferred from an initiator to a destination via a channel or in a response signal transferred from the destination via the channel indicates that a highest priority is assigned to a transaction between the initiator and the destination in the network, when the instruction contained in the command signal corresponds to address information contained in the transfer signal and response information contained in the response signal, and indicates last data of a signal transferred between the initiator and the destination when the instruction contained in the command signal corresponds to control information contained in the transfer signal and data contained in the transfer signal and the response signal.

17 Claims, 14 Drawing Sheets

4 burst, BSIZ=3, start address:0x102

| data#1 | –  | –  | 0  | 1  | 2  | 3  | 4  | 5  |
|--------|----|----|----|----|----|----|----|----|
| data#2 | 6  | 7  | 8  | 9  | 10 | 11 | 12 | 13 |
| data#3 | 14 | 15 | 16 | 17 | 18 | 19 | 20 | 21 |
| data#4 | 22 | 23 | 24 | 25 | 26 | 27 | 28 | 29 |
| data#5 | 30 | 31 | –  | –  | –  | –  | –  | –  |

DALGN=0

(a)

| data#1 | 0  | 1  | 2  | 3  | 4  | 5  | 6  | 7  |
|--------|----|----|----|----|----|----|----|----|
| data#2 | 8  | 9  | 10 | 11 | 12 | 13 | 14 | 15 |
| data#3 | 16 | 17 | 18 | 19 | 20 | 21 | 22 | 23 |
| data#4 | 24 | 25 | 26 | 27 | 28 | 29 | 30 | 31 |
|        |    |    |    |    |    |    |    |    |

DALGN=1

(b)

4 burst, BSIZ=0, start address:0x102

| data#1 | – | – | 0 | – | – | – | – | – |
|--------|---|---|---|---|---|---|---|---|
| data#2 | – | – | – | 1 | – | – | – | – |
| data#3 | – | – | – | – | 2 | – | – | – |
| data#4 | – | – | – | – | – | 3 | – | – |
| data#5 |   |   |   |   |   |   |   |   |

DALGN=0

(c)

| data#1 | 0 | – | – | – | – | – | – | – |
|--------|---|---|---|---|---|---|---|---|
| data#2 | 1 | – | – | – | – | – | – | – |
| data#3 | 2 | – | – | – | – | – | – | – |
| data#4 | 3 | – | – | – | – | – | – | – |
| data#5 |   |   |   |   |   |   |   |   |

DALGN=1

| 63 | | 0 |
|---|---|---|
| | Response (0 padding) | |

SYSTEM-ON-CHIP-BASED NETWORK PROTOCOL IN CONSIDERATION OF NETWORK EFFICIENCY

CROSS-REFERENCE TO RELATED APPLICATION

This application is the National Stage of International Application No. PCT/KR2010/007267, filed on Oct. 22, 2010, and claims priority to and the benefit of Korean Patent Application No. 2010-0032697, filed on Apr. 9, 2010, the disclosure of which is incorporated herein by reference in its entirety.

BACKGROUND

1. Field of the Invention

The present invention relates to a system-on-chip (SoC)-based system network protocol in consideration of network efficiency, and more particularly, to a network protocol for data exchange in a chip-based system.

2. Discussion of Related Art

In recent years, with the development of semiconductor process technology and system design technology, SoC technology has developed rapidly. As methods and technologies of building a system become diversified, an internal structure of an SoC becomes more complicated. Also, as a variety of high-quality multimedia data are required, an amount of data to be processed has tremendously increased. To this end, multiple processors for parallel processing are embedded and intellectual properties (IPs) for various communication and peripheral devices are included to realize various functions, leading to a system including several chipsets, and research is being conducted for introduction of a network-on-chip (NoC) for parallel processing, making communication inside the system very complex. Accordingly, system performance is greatly affected by data communication performance rather than computing power of a computing unit. To resolve such problems, a variety of on-chip-network structures and protocols have been studied.

AMBA AHB, AMBA AXI, WISHBONE, CoreConnect, OCP, SNP, XSNP and the like are representative interface protocols. Representative on-chip-network structures include Nostrum, Hermes, QNOC, aSoC, Octagon, AEthereal, SoC-Bus, SNA, AMBA interconnect matrix, AXI Interconnect, Smart Interconnect and the like.

In the case of on-chip protocols, protocols for communication inside the SoC described above are less compatible with protocols for communication of an NoC such as Nostrum or off-chip communication such as PCI express. Accordingly, it is not suitable to use such protocols as NoC or off-chip protocols. A protocol including a number of control signal lines is not suitable for off-chip communication with a narrow data width. Recently, as design of a processor having multiple cores has become active, commercial technologies that can be variously applied to off-chip communication, such as processor-to-processor connections or chip-to-chip connections, are being developed. Such a trend of design requires high-performance off-chip communication as on-chip communication and off-chip communication are seamlessly connected.

In the number of signal lines, the off-chip communication is more limited than the on-chip communication. Since the number of interface signal lines is directly associated with the number of input/output pins of a package and the number of lines of a printed circuit board (PCB), the number of interface signal lines is sensitive to physical cost and an operating frequency. Accordingly, three or more types of protocols may be present in a multi-chipset including an NoC. This makes system design complex and causes performance degradation due to protocol conversion in communication.

Meanwhile, most of the existing interface protocols are asymmetric protocols and have a format in which communication is initiated by a master and terminated by a slave. Accordingly, a bidirectional protocol requiring an immediate response, such as AHB, is inefficient since a communication channel is open until the communication is completed. Also, in a point-to-point communication-based protocol such as AXI, a master needs to re-initiate communication using an interrupt or polling scheme in order to receive a result of execution from the slave after delivering a command even when a communication channel need not be opened due to the protocol supporting unidirectional communication.

To resolve this problem, an existing protocol allows an IP to have both a master interface and a slave interface to improve performance. However, double signal lines are required in order for one IP to have two such functions due to an asymmetric structure between the master interface and the slave interface. Also, there are many protocols including many signal lines to provide various functions in transferring data and improve performance. When a scale of the SoC is increased and many functional blocks are integrated into one system, a number of signal lines may cause routing congestion. Accordingly, there is a need for technology by which desired effects can be obtained while minimizing the number of additional signal lines.

As there are a variety of communication patterns of an SoC system, a differentiated service that supports quality of service (QoS) is provided on an on-chip network, as in a computer network. In most existing network structures, QoS is determined in the on-chip network, and an opportunity to select QoS is not provided to an IP that performs actual communication. This is because the existing on-chip network structure is used only for a specific system or provides only structural support with no consideration of characteristics of a variety of systems. Also, since the existing protocol has no consideration for QoS support, an IP designer cannot implement an IP to selectively generate QoS depending on conditions. Recently, a QoS signal has been added in AMBA AXI4, but use of the QoS signal has not been sufficiently studied and functions of the QoS signal have not been clearly defined. In a structure in which various communication traffics may be generated due to parallel processing like a multi-processor SoC (MPSoC), if QoS can be determined on an IP level, more efficient communication can be performed.

SUMMARY OF THE INVENTION

The present invention is directed to an SoC-based system network protocol that has a symmetric structure, is simultaneously applicable to a variety of communication schemes, determines QoS on a level of an interface transmitting a signal, and reduces the number of signal transmission and reception cycles for high efficiency of a network.

According to an aspect of the present invention, there is provided a network protocol for data transfer between an initiator that is an interface initiating communication over a network and a destination that is an interface responding to the communication initiation of the initiator, wherein: a command signal containing an instruction is transferred, the instruction defining information contained in a transfer signal transferred from the initiator to the destination via a channel or in a response signal transferred from the destination via the channel, a most significant bit of the command signal indicates that a highest priority is assigned to a transaction between the initiator and the destination in the network when the instruction contained in the command signal corresponds to address information contained in the transfer signal and response information contained in the response signal, and indicates last data of a signal transferred between the initiator and the destination when the instruction contained in the command signal corresponds to control information contained in the transfer signal and data contained in the transfer signal and the response signal.

According to the SoC-based system network protocol in consideration of network efficiency according to the present invention, the transfer signal having a packet format containing the address, the control information, and the data are transferred from the initiator to the destination, and simultaneously, the command signal containing the instruction defining information contained in the transfer signal is transferred, in which the MSB of the command signal indicates that a transaction between the initiator and the destination has the highest priority, thereby flexibly controlling the priority on software, unlike an existing method in which the priority is fixedly determined on hardware.

Further, each field value of the control information contained in the transfer signal and transferred is adjusted, thus allowing a delay response for the destination and increasing communication efficiency through control information lock between the same initiator and the destination. Furthermore, when the length of the data or the address is shorter than the channel width, both the address and the control information are contained in one packet and transferred to reduce the number of transfer cycles. Thus, several packet formats are provided so that a communication scheme can be selected according to system characteristics. Accordingly, it is possible to improve network efficiency.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 is a diagram illustrating an order in which a byte lane is filled with data of a packet according to a DALGN value when an unaligned address is used;

FIGS. 5 to 8 are diagrams illustrating formats of a transfer packet and a response packet in regular transfer;

DETAILED DESCRIPTION OF EXEMPLARY EMBODIMENTS

Hereinafter, exemplary embodiments of an SoC-based system network protocol for network efficiency according to the present invention will be described in detail with reference to the accompanying drawings.

Figure 1:
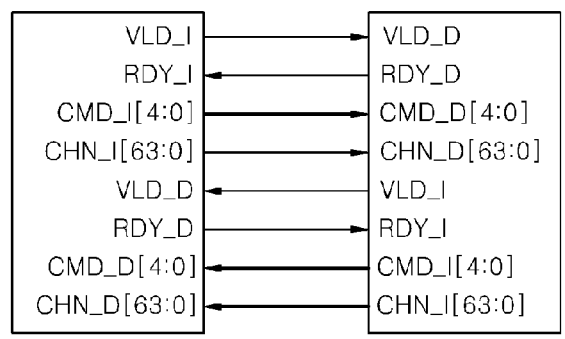
FIG. 1 is a diagram illustrating signals transferred according to a network protocol according to the present invention.

A protocol proposed in the present invention is referred to as a unified system interface protocol (USIP). The USIP according to the present invention is a point-to-point protocol that is applicable to various environments and has a simple interface according to a symmetric structure. FIG. 1 is a diagram illustrating a plurality of signals transferred according to the USIP, such as the four signals valid (VLD), ready (RDY), command (CMD), and channel (CHN) for handshaking communication. In FIG. 1, I and D indicate an initiator that is an interface initiating communication and a destination that is an interface responding to the initiator, respectively.

In the four signals shown in FIG. 1, VLD means that current communication is valid, and RDY means that valid communication can be performed normally. When VLD and RDY are activated simultaneously, communication is regarded as having been completed. Also, a CHN is a physical channel through which data, an address, and control information are delivered, and a CMD indicates a meaning and feature of information currently delivered through CHN.

Each signal is transferred in one direction and includes a pair of an input signal and an output signal. Each channel operates independently, and one interface fundamentally performs bidirectional independent communication (duplex). In USIP, one CHN is used for transferring data, control information (side band information; SBI), and address information. In fact, in one transaction for on-chip communication, since the address information simply increments/decrements and the control information is maintained for a certain period of time, the channel can be shared.

Since the USIP has a symmetric structure, an initiator and a destination cannot be identified with only a physical interface of an intellectual property (IP). Roles of the initiator and the destination are identified when data transfer actually occurs. Accordingly, each interface serves as both the initiator and the destination with no additional signal line, as illustrated in FIG. 1. In terms of a logical function, the initiator serves as a master for AMBA, and the destination serves as a slave. In the case of AMBA, DMAC requiring both a master function and a slave function requires two interfaces. On the other hand, in the USIP, since the role of the initiator and the role of the destination can be performed using one interface, the number of interfaces does not increase according to functions of the IP. Such a characteristic enables a communication scheme in which all IPs actively initiate data transfer in the USIP above an existing master/slave concept.

The USIP requires 142 signal lines since 64-bit handshaking communication is fundamentally performed. On the other hand, AMBA AHB requires 416 signal lines and AMBA AXI requires 600 signal lines for both a 64-bit master interface and a 64-bit slave interface. Thus, it can be seen that USIP provides higher network efficiency than the existing protocol. The signal line of the channel may increase to 128 bits or more or decrease to 32 bits or less, as necessary. When the signal line increases to 128 bits, two channel values are transferred at one time, and when the signal line decreases, one channel value is transferred two times or more.

Since the address, the data, and the control information are transferred via the channel, a command indicating a meaning and a characteristic of information loaded on the channel is delivered together through a command signal (CMD). The CMD is a 5-bit signal. A most significant bit (MSB) of the CMD indicates a priority of a transaction or an end of a packet. Four lower bits of the CMD indicate fifteen commands. Each command defines information delivered via the channel. Operational characteristics of commands according to codes of the CMD are shown in Table 1.

TABLE 1

| MSB | Code | Command | Operational characteristics |
|---|---|---|---|
| — | 0000 | IDLE | No communication |
| F | 0001 | RSPO | Simple response from destination, not followed by data |
| F | 0010 | RSP | Response from destination, followed by data |
| F | 0011 | RSPD | Response to single data transfer. Response and data are simultaneously transferred. |
| E | 0100 | DATA | Transaction data |
| E | 0101 | EXT | Extension mode |
| — | 0110 | | Reserved |
| E | 0111 | SBI | Control information of transfer signal (SBI64 mode) |
| F | 1000 | AWD | Address for single data write operation |
| F | 1001 | AWS | Address for write operation in SBI32 mode (including SBI_H) |
| F | 1010 | AWT | Address for regular write operation |
| F | 1011 | ARTO | Address for regular read operation (no SBI or data). Used only when RW is 0 in SBI-lock state |
| F | 1100 | ARD | Address for read operation including single data |
| F | 1101 | ARSO | Address for read operation in SBI32 mode (no data (RW = 0), including SBI_H) |
| F | 1110 | ARS | Address for read operation in SBI32 mode (including SBI_H) |
| F | 1111 | ART | Address for regular read operation |

Referring to Table 1, when the MSB is F, this indicates a priority and is applied to a command corresponding to information that is first transferred via the channel like an address or a response command. When F is 1, this indicates a 'Fast' mode in which the network ignores an original priority defined for an initiator originating a transaction and assigns the highest priority. Accordingly, a method of allowing an initiator IP to select QoS is provided to enable QoS to be implemented by control on a software level. When F is 0, this indicates a 'Normal' mode in which the transaction is processed according to a priority defined in the network. When a network analyzes control information contained in a packet, four QoS support levels are determined by the bit F and a QoS bit of the control information.

When the MSB is E, this is applied to a command corresponding to information transferred via the channel a second or subsequent time, and is used to inform of the end of the packet. When E is 1, this indicates that the data of the channel is the end of the packet, allowing the network to release the channel. When E is 0, this indicates that there is next data, so that the channel should be opened.

In Table 1, the fifteen commands include: F-series commands including eight commands (commands beginning with AW and AR) informing that a read address or a write address is in the channel and a transaction is initiated, and three commands (RSP, RSPD and RSPO) informing that a response is initiated; E-series commands including two commands (DATA and SBI) indicating types of data in the channel, and a command (EXT) for command extension; and an IDLE command indicating that communication is not currently performed. The IDLE command belongs to neither the F series nor the E series.

The eight commands related to addresses define an address for a read operation or a write operation and have different values according to five read communication schemes and three write communication schemes. A detailed communication scheme will be described below. The three commands indicating response initiation are used according to a type of an initiation command. In the case of RSP, RSP forms a packet containing data together with a DATA command. In the case of a simple response in which there is no data as in a pure write operation, an RSPO command is used. Also, RSPD is the same as RSPO in that RSPD is not followed by the DATA command, but differs from RSPO in that data are transferred together with response information via the channel. DATA indicates that there is pure data in the channel, and SBI indicates that there is SBI64-mode control information in the channel, and is used to support a variety of communication schemes. EXT indicates that an immediately previous transferred command is continued, and is mainly used when communication is performed from a domain having a wide data width to a domain having a narrow data width. In the case of DATA, SBI, and EXT, which are the E-series commands, if such commands are located in the end of the packet, E is 1, and otherwise, E is 0.

The commands directly provide information on a channel to the network, and help the network to effectively transfer a packet. Since it is difficult for a control information signal (SBI) transferred via the channel to be analyzed in real time in a network having a bus structure, it is difficult to reflect the control information signal on the transfer. The control information signal is applicable to only an NoC structure. Also, since complex information related to the packet delivery is contained, a hardware structure of the network is made complex. When a definition of the control information signal is changed, the network should be redesigned. On the other hand, a command delivered via a separate signal line can be analyzed and applied in real time even in the network having a bus structure, and only information on the start and the end of the packet, which is delivered via the channel, is contained. Accordingly, it is possible to provide only essential information for communication without imposing a burden on the network.

As described above, the control information signal is transferred via the channel rather than a separate signal line in the form of SBI from the initiator and in the form of response information from the destination. Each of the SBI and the response information includes a plurality of fields.

Figure 2:
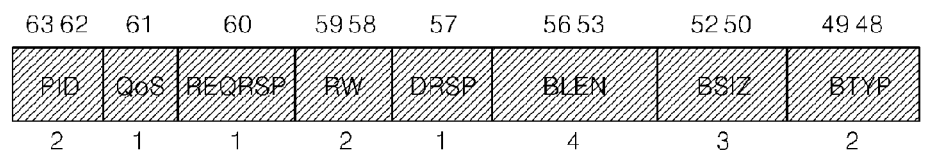
FIG. 2 is a diagram illustrating information contained in an SBI field.
Figure 2:
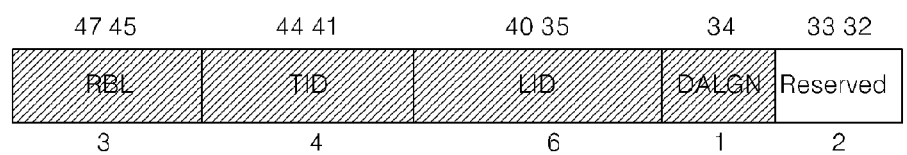
Figure 2:
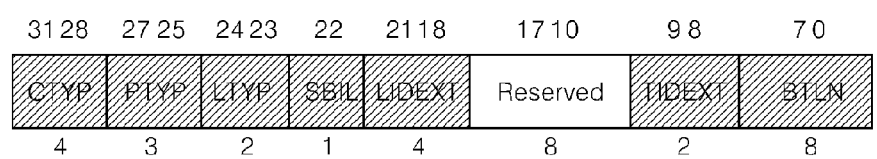

FIG. 2 is a diagram illustrating information contained in the SBI field. In FIG. 2, numbers shown on each field value indicate bit locations of a start and an end, and a number shown under each field value indicates the number of bits of the field. SBI is divided into 32-bit SBI_H and 32-bit SBI_L. FIG. 2(a) illustrates the SBI_H, and FIG. 2(b) illustrates the SBI_L. In communication schemes that will be described below, an SBI32 mode using only 32-bit SBI uses the SBI_H of FIG. 2(a), and an SBI64 mode using 64-bit SBI uses both the SBI_H and SBI_L.

Table 2 shows field values and operational characteristics of the SBI illustrated in FIG. 2 and default values of the fields.

TABLE 2

| SBI field | Description | Size [bits] | Default value |
|---|---|---|---|
| PID | Protocol ID | 2 | 0 (USIP) |
| QoS | Quality of Service | 1 | 0 |
| REQRSP | Request Response | 1 | 1 |
| RW | Read and Write Enable | 2 | 0 |
| DRSP | Delayed Response | 1 | 0 |
| BLEN | Burst Length | 4 | 3 (4 bursts) |
| BSIZ | Burst Size | 3 | 3 (8 bytes) |
| BTYP | Burst Type | 2 | 1 |
| RBL | Response Burst Length | 3 | 0 |
| TID | Transaction ID | 4 | 0 |
| LID | Link ID | 6 | — |
| DALGN | Data Align | 1 | 0 |
| CTYP | Cache Type | 4 | 0 |
| PTYP | Protect Type | 3 | 2 |
| SBIL | SBI-lock | 1 | 0 |
| LTYP | Lock Type | 2 | 0 |
| LIDEXT | Network ID Extension | 4 | 0 |
| TIDEXT | Order ID Extension | 2 | 0 |
| BTLN | Byte Lane | 8 | 255 |

Hereinafter, the field values of the SBI shown in Table 2 will be described in detail.

Protocol identification (PID) is a protocol information field used to identify different types of protocols by assigning IDs to the protocols when the protocols are used. The PID can simultaneously support a maximum of four different types of protocols, and is a signal used in a unit, such as a protocol converter other than the IP. Use of the PID enables information of different protocols used by IPs to be recognized even when communication is performed between the IPs using the different protocols, thus allowing appropriate protocol conversion.

QoS (Quality of Service) is a priority field used when communication with guaranteed bandwidth quality is required to the network and the destination, and is meaningful when the network and the destination support such a function. A QoS bit forms a 2-bit signal together with a bit F of the command. Accordingly, when the network analyzes the SBI, the bit F, which is an upper bit, and the QoS bit indicate QoS levels 0 to 3, and a value of each level may be determined by a system designer. Here, 0 indicates that QoS is not activated, 1, 2 or 3 indicates that QoS is activated, and the greater value of the QoS level indicates a higher QoS level.

For example, when the QoS level becomes higher, the network executes routing of a packet so that a broader bandwidth is guaranteed, and the destination also adjusts a priority of a response to satisfy a determined bandwidth. When the network does not analyze the SBI, the network supports QoS with only the bit F, and the destination combines the bit F and the QoS bit and supports QoS according to a determined level. Generally, when the destination does not support out-of-order completion communication, it can support the QoS only with a response made by setting the bit F to 1. Thus, as various QoS levels are determined using both the bit F and the QoS value, the increase in the number of connection lines between the initiator and the destination can be minimized and QoS can be supported in both the bus architecture and the NoC architecture.

REQRSP (request response) is a response request signal. When the REQRSP value is 0, the destination need not transfer a response signal. Even when an error occurs in the destination, the destination need not transfer the response signal. If the destination transfers the response signal without analyzing the REQRSP signal, the initiator ignores the response signal.

RW (simultaneous read and write enable) is a simultaneous read/write signal, and it enables a read operation and a write operation simultaneously occurring in one transaction. RW consists of 2 bits and has values of 0 to 3. A simultaneous read and write function is not activated when RW is 0, and is activated only when RW is not 0. When the RW function is activated, different results are obtained for a read command and a write command. In the case of a read command in which the RW function has been activated, a write-after-read operation in which a value is first read from a read address and data of a packet is written to a write address is performed. In the case of a write command in which the RW function has been activated, a read-after-write operation in which data of a packet is first written to the write address and data are read from the read address is performed. When the read address differs from the write address, the same result may be obtained according to operations based on the read command and the write command. On the other hand, when the read address is the same as the write address, completely different results are obtained.

When RW is activated, an address to be additionally provided is determined according to the RW value. That is, in the case of the read command in which RW has been activated, a write address for writing data is additionally required. In this case, when RW is 1, a read address and a write address are the same, and when RW is 2, a predetermined address is used as the write address at the destination. When RW is 3, the write address is provided in the packet, and the SBI command is followed by the EXT command to provide the write address. Even in the case of the write command in which RW has been activated, an operation similar to that based on the read command is performed, but the read address is changed according to the RW value.

As described above, RW allows communication in which read and write are continuously required to be processed as one transaction, thus increasing communication efficiency. For example, such processing is possible through one communication when a value stored in a memory and a value stored in a register of a processor are switched. Also, if the destination is an IP communicating with the outside, the processor may give outgoing data and simultaneously receive a value that the destination has received from the outside. When the destination is a computing unit that continuously processes a series of data, an operation of supplying new data while reading a previous computation result is possible through one communication.

DRSP (delayed response) is a delay response allowance signal, and is used when the destination can respond to a read command only if a specific condition is satisfied in a read-after-write operation or a simple read operation. For example, there is a case in which the destination responds to the read command after a value stored in a read address is changed. In this case, DRSP allows an operation in which the initiator supplies data to the destination and reads a computation result after computation using such data ends, to be performed in one transaction, thereby increasing communication efficiency. Also, if the initiator requests data from the destination, which cannot know when data can be transferred, the destination can transfer the data to the initiator when the data are prepared.

When DRSP is used, the initiator cannot know when a response is transferred to the initiator. Accordingly, the initiator should be able to perform other tasks while waiting for the response. This allows the initiator not to perform a polling operation or allows the destination not to use an interrupt signal to complete a transfer operation through one communication, thereby increasing communication efficiency. The destination has limitation in a response delay time according to the characteristic of the IP, and makes a provisional error response when the destination cannot make a response even though the limited time has elapsed. An example thereof is a case in which an IP communicating with the outside does not receive data for a long time.

BLEN (burst length) indicates a burst size of a transaction and can have a maximum of 32 values. Table 3 shows burst lengths according to BLEN values.

TABLE 3

| BLEN | Burst length |
|---|---|
| 0000 (0) | unspecified |
| 0001 (1) | 1 |
| 0010 (2) | 2 |
| 0011 (3) | 3 |
| 0100 (4) | 4 |
| 0101 (5) | 5 |
| 0110 (6) | 6 |
| 0111 (7) | 7 |
| 1000 (8) | 8 |
| 1001 (9) | 10 |
| 1010 (10) | 12 |
| 1011 (11) | 16 |
| 1100 (12) | 20 |
| 1101 (13) | 24 |
| 1110 (14) | 28 |
| 1111 (15) | 32 |

BLEN is a 4-bit burst length signal. As shown in Table 3, the burst length increases by 1 up to the burst 8, 2 up to the burst 12, and 4 up to the burst 32. When BLEN is 0, the burst length is unspecified, and last data of the packet is determined by the bit E of the command.

Further, BSIZ (burst size) indicates a size of transferred data and can have 8 to 1024 bits. BSIZ should not be greater than a channel width. BTYP (burst type) supports three types: address fixed, address increment and address wrapping, which are supported by AMBA AXI, and additionally supports a user-defined address scheme (predefined sequence). This is a scheme in which address values are stored in the destination in a predefined order and the addresses in the burst operation are changed in the order. In the destination, when addresses accessible to the initiator are not continuous or when data should be read or written in a specific order, communication is completed through one transaction, thereby increasing communication efficiency.

BLEN has the same value as the SBI of the initiator, but may have a different value depending on destinations. In this case, the BLEN value of the destination should not be greater than that of the initiator, and when a small BLEN value is used, a response packet is transferred two times or more. In this case, a total sum of the BLEN values of the response packet should be equal to the BLEN value of the initiator. When the destination responds with two or more split packets, the packets are identified by a burst ID (BID), i.e., a value of a split identification field. That is, when BID is 0, the BLEN value of the initiator is equal to that of the destination and communication is completed with one response. When the destination responds with two or more split packets, BID ranges from 1 to 7 and the BID of the last packet becomes 0. The destination can respond with a total of 8 split packets. The BID of the last packet becomes 0 irrespective of the number of packets that form the response.

RBL (response burst length) is used for a split response request to request split response packets in response to one transfer request. That is, since RBL indicates a burst length of one split packet, RBL should be smaller than a burst length of the entire packet, and the number of split packets should not exceed 8. This is because a response packet can be split into a maximum of eight packets. RBL allows communication to be performed using a buffer having a relatively small size while the initiator receives all data through one transfer request when the initiator deals with relatively large block data. Also, since the destination splits a response having a long burst length into several packets and transfers the split packets, a response having a high priority or requiring guaranteed QoS is allowed to be inserted between the split packets, thereby increasing the transfer efficiency of the system. When the RBL is equal to 0, a split response is determined by the destination. When the RBL values are 5 and 6, burst lengths are 8 and 16, respectively. When RBL is equal to 7, no split response is allowed. The other values are equal to the burst length of the split response.

When a total burst length is not a multiple of RBL, a last packet is made smaller than RBL for matching of the total length. When the destination does not support the function of splitting a response packet, the destination ignores RBL and responds with one packet. Accordingly, the initiator checks whether the split response is supported in the first transfer. When no split response is supported, the initiator should split a transfer request into allowed sizes and request the transfer several times.

When the split response is requested by the initiator, the response packet is split according to the RBL value by the destination, and when the split response is performed depending on a condition or need of the destination, the response packet is split into appropriate burst lengths by the destination. When the destination does support the split response, the destination responds according to the BLEN value of the SBI, with BID being equal to 0, irrespective of the RBL value, and then the initiator does not request the split response.

TID (transaction ID) indicates an ID of a transaction or a packet sent by the initiator, and is used to identify different transactions of an outstanding address scheme or an out-of-order completion scheme. In the SBI32 mode, a maximum of sixteen IDs are assigned. In the SBI64 mode, 64 IDs are assigned together with TIDEXT (Transaction ID Extension).

LID (link ID) indicates an initiator identification field that is an ID of a port to which an initiator IP is currently connected. LID is irrelevant to an IP operation and is used by the network. Accordingly, in an address routing scheme in which the initiator finds the destination using an address value, the initiator performs communication in a state in which LID is empty, and LID is filled in the network. LID has a 6-bit size. Using LID, 64 IDs can be assigned in the SBI32 mode and 1,024 IDs can be assigned together with LIDEXT (link ID extension) in the SBI64 mode. However, in an XY routing scheme in which a coordinate is given to each IP, the initiator designates this coordinate to create a packet, and the network finds the destination using the coordinate, and the initiator fills the LID field with the coordinate and sends the resultant LID field.

The USIP basically allows unaligned addresses. DALGN (data align) is an align field used when data are not transferred beginning with a byte lane corresponding to the address, but is transferred beginning with a first filled byte lane in using an unaligned address. When DALGN is activated, byte lanes corresponding to BSIZ are filled with data, beginning with a $0^{th}$ byte lane. In FIG. 3, an example of a data transfer scheme changed according to activation of DALGN is illustrated.

FIGS. 3(a) and 3(b) are diagrams illustrating data alignment forms in a case in which DALGN is not activated when the BSIZ value is 3 and a case in which DALGN is activated when the BSIZ value is 3, respectively. When the DALGN value is set to 0, data are aligned from a location specified as a start address, and transferred as five packets, as illustrated in FIG. 3(a). On the other hand, when the DALGN value is set to 1, data are aligned from a first byte lane and transferred as four packets, as illustrated in FIG. 3(b). FIGS. 3(c) and 3(d) are diagrams illustrating data alignment forms in a case in which DALGN is not activated when the BSIZ value is 0 and a case in which DALGN is activated when the BSIZ value is 0. Referring to FIG. 3(c), when the DALGN value is set to 0, a byte lane corresponding to a start address is filled with data. On the other hand, when the DALGN value is set to 1, a first byte lane is filled with data irrespective of the address, as illustrated in FIG. 3(d).

CTYP (Cache Type) indicates cache characteristics of ongoing communication, and is defined as in AMBA AXI. Table 4 shows operational characteristics according to a type of a cache.

TABLE 4

| Cache type | Operational characteristics |
| --- | --- |
| 0000 | Non-cacheable and non-bufferable |
| 0001 | Bufferable only |
| 0010 | Cacheable, but not allocated |
| 0011 | Cacheable and bufferable, but not allocated |
| 0100 | Reserved |
| 0101 | Reserved |
| 0110 | Cacheable by write-through, allocated to read only |
| 0111 | Cacheable by write-back, allocated to read only |
| 1000 | Reserved |
| 1001 | Reserved |
| 1010 | Cacheable by write-through, allocated to write only |
| 1011 | Cacheable by write-back, allocated to write only |
| 1100 | Reserved |
| 1101 | Reserved |
| 1110 | Cacheable by write-through, allocated to both read and write |
| 1111 | Cacheable by write-back, allocated to both read and write |

PTYP (protection type) is a 3-bit signal and indicates a protection characteristic of ongoing communication. PTYP indicates privileged when its lower bit is 1, normal when its lower bit is 0, non-secure when its middle bit is 1, secure when its middle bit is 0, an instruction when its upper bit is 1, and data when its upper bit is 0. Thus, PTYP is defined as in AMBA AXI.

LTYP (lock type) is a lock type field used to support atomic access. LTYP supports three access schemes: Normal, Exclusive, and Locked, which are supported by AMBA AXI, and additionally supports an SBI-lock access scheme. In the SBI-lock access scheme, an SBIL value of SBI_L used in an SBI64 mode is activated. The SBI-lock access scheme will be described below in detail.

SBIL is a control information lock field that is valid when LTYP is the SBI-lock access scheme, as described above. When SBIL is 1, the destination stores an SBI value of a current packet, and uses the stored SBI value when receiving a packet with no SBI. Then, when the destination receives a packet which contains SBI and in which LTYP is not SBI-lock from the initiator, the destination applies new SBI to only the packet, and uses the stored SBI value again when receiving a packet with no SBI.

When another initiator attempts SBI-lock in a state in which the destination has been SBI-locked, the destination transfers an SBI-lock failure response to inform that the destination has already been SBI-locked. Accordingly, if the initiator does not release the SBI-lock after setting the destination to an SBI-lock mode and then completing necessary communication, another initiator requiring such an SBI-lock function cannot perform the communication, thereby degrading communication efficiency. Accordingly, it is desirable for the initiator to release the SBI-lock access mode of the destination by transferring a transfer signal in which SBIL is set to 0 in a state in which LTYP is SBI-lock to the destination when SBI-lock communication is completed.

BTLN (byte lane) functions to activate an 8-byte channel in units of bytes. Each bit of an 8-bit BTLN is connected to an 8-byte byte lane. When the bit of BTLN is 0, the byte connected to the bit is deactivated. Also, BTLN is valid only when STRB is activated.

Figure 8:
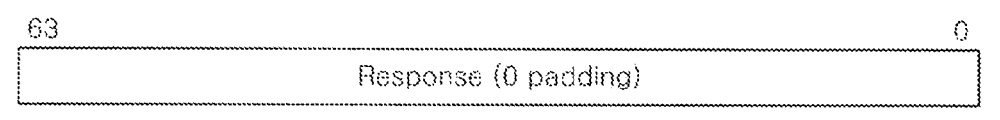

Meanwhile, in the SBI format of FIG. 2, 2 bits contained in the SBI_H of FIG. 2(a) and 8 bits contained in the SBI_L of FIG. 2(b) are reserved areas, and are used to extend a specific field of the SBI later. For example, the 2 bits of SBI_H may be used to extend the LID and the address, and the 8 bits of SBI_L may be used to extend LIDEXT and TIDEXT. Also, the reserved areas may be used to increase compatibility between protocols by storing information of a specific protocol according to a PID value using a protocol converter in a specific system. In this case, the protocol converter can be used only in a specific system.

Figure 4:
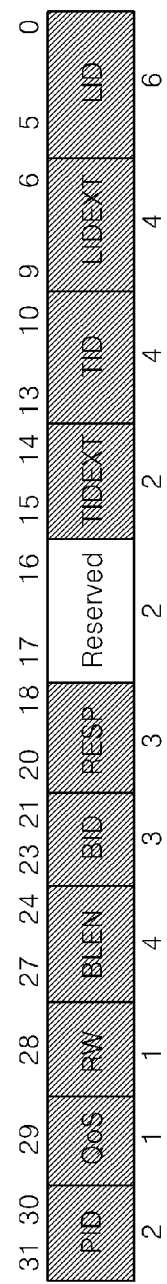
FIG. 4 is a diagram illustrating information contained in each field of response information.

A response signal is also transferred with response information corresponding to the SBI, which contains a plurality of fields and has a 32-bit length. FIG. 4 is a diagram illustrating information contained in each field of the response information. In FIG. 4, numbers shown on each field value indicate bit locations of a start and an end, and a number shown under each field value indicates the number of bits of the field, as in FIG. 2.

Referring to FIG. 4, information contained in each field of the response information is similar to that in the SBI. Table 5 indicates information on each field of the response information.

TABLE 5

| Response information field | Description | Size | Default value |
| --- | --- | --- | --- |
| PID | Protocol ID | 2 | 0 |
| QoS | Quality of Service | 1 | — |
| RW | Read and Write | 1 | 0 |
| BLEN | Burst Length | 4 | — |
| BID | Burst ID | 3 | 0 |
| RESP | Response | 3 | 0 |
| TIDEXT | Transaction ID Extension | 2 | — |
| TID | Transaction ID | 4 | — |
| LIDEXT | Link ID Extension | 4 | — |
| LID | Link ID | 6 | — |

In Table 5, the default value '—' indicates use of the same value as the value sent by the initiator. In the case of a read response, BLEN fundamentally has a value delivered from the initiator. However, when there is a request for a split response, a burst length indicated by the request from the initiator is used, and even when there is no request for a split response, the value is determined by the destination when the destination determines to make a split response. In the case of a write response, when RW≠0, the write response is same as the read response. In a simple write response in which RW is 0, the burst length of data transferred from the destination is determined as the BLEN value and the initiator can confirm the amount of actually delivered data from a response signal.

The value of PID is filled in a protocol converter, and QoS has the same value as SBI transferred by the initiator. When RW is 0, this indicates that a destination does not support a simultaneous read and write operation. Accordingly, the initiator checks the RW value of a response in first communication with the destination, and if the RW value of the response is set to 0, then the initiator should not use an RW function.

RESP (response) is a response signal to the transaction of the initiator. As shown in Table 6, there are seven types of responses.

TABLE 6

| Response signal | Operational characteristics |
| --- | --- |
| 000 | Normal access has been completed successfully |
| 001 | Exclusive access has been completed successfully |
| 010 | Permanent error |
| 011 | Decoder error |
| 100 | Provisional error |
| 101 | SBI-lock failure |
| 110 | Simultaneous access for read and write fails |
| 111 | Reserved |

When RESP is 0, this indicates that normal access has been completed successfully, and corresponds to a case in which exclusive access has failed or the destination does not support the exclusive access. When RESP is 1, this indicates that the exclusive access has succeeded. When RESP is 2, this indicates that transaction has failed due to a permanent error occurring in the destination, and the initiator cannot attempt the same transaction again. When RESP is 3, this indicates that a decoding error occurs, and the network or a default destination transfers a response signal. When RESP is 4, this corresponds to a case in which a provisional error has occurred, and indicates that communication has failed, but can be successful if the initiator attempts the communication again. This response is also used when the destination is locked.

When RESP is 5, this indicates an SBI-lock error, and is a response generated when another initiator attempts SBI-lock of a destination that has already been SBI-locked. When RESP is 6, this indicates that, in the case of the RW operation, an error occurs due to a destination not supporting the RW operation or for another reason, and accordingly, a write operation for a read command has failed or a read operation for a write command has failed. In other words, when an additionally performed operation has failed, RESP becomes 6, and when the read operation for the read command has failed or the write operation for the write command has failed, an error response in which RESP is 2 or 4 is transferred.

TIDEXT, TID, LIDEXT, and LID have values transferred from the initiator and are used when the network sends a response packet to the initiator.

Communication using USIP having the above-described structure is performed as the address, the control information, and the data are sequentially delivered together with the command via the CHN signal line in a handshaking scheme. In a signal transmitting and receiving method using USIP that is a network protocol according to the present invention, there are three types of transfer schemes and two types of response schemes.

Figure 5:
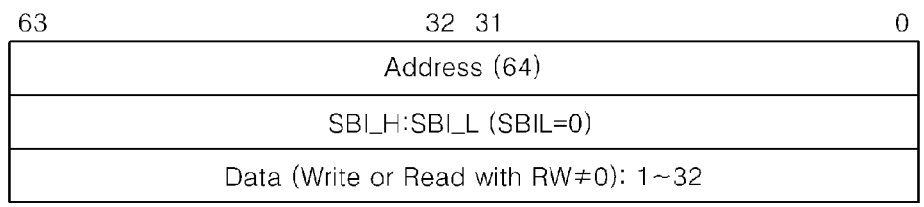
Figure 6:
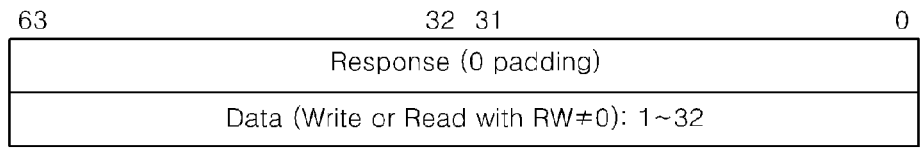
Figure 7:
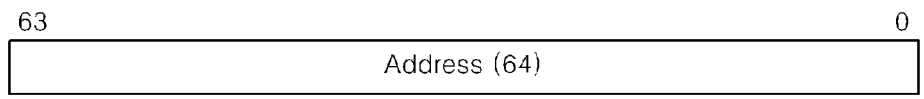

A first transfer scheme is a regular transfer scheme. FIGS. 5 to 8 are diagrams illustrating formats of a transfer packet and a response packet in the regular transfer, respectively. A regular transfer packet uses a 64-bit address and an SBI64 mode, as illustrated in FIG. 5. Also, data basically consists of 64 bits, and the address is delivered together with an AWT or ART command. The response packet is created in the form of a 64-bit response signal by padding a 32-bit response signal with 0, as illustrated in FIG. 6. FIG. 7 illustrates a packet format of an ARTO command in the regular transfer in which only an address is transferred with no SBI and DATA, and is used in a read operation in which RW is 0 and the destination is SBI-locked. Also, FIG. 8 is a diagram illustrating a packet format of the RSPO command in which only a response signal is transferred in response to a write request when RW is 0.

Figure 9:
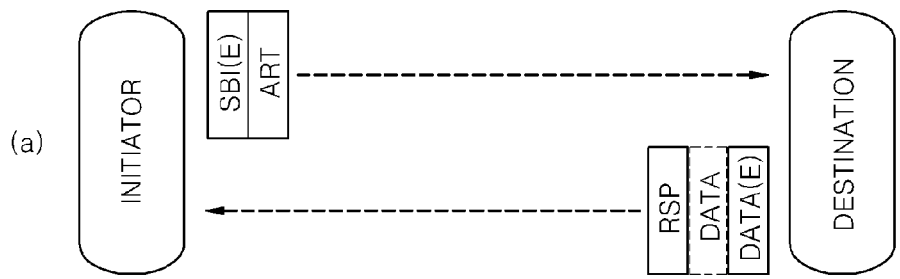
FIGS. 9 to 11 are diagrams illustrating examples of a regular read operation that are performed when RW is 0 and when RW is not 0 and an initiator requests split transfer.
Figure 10:
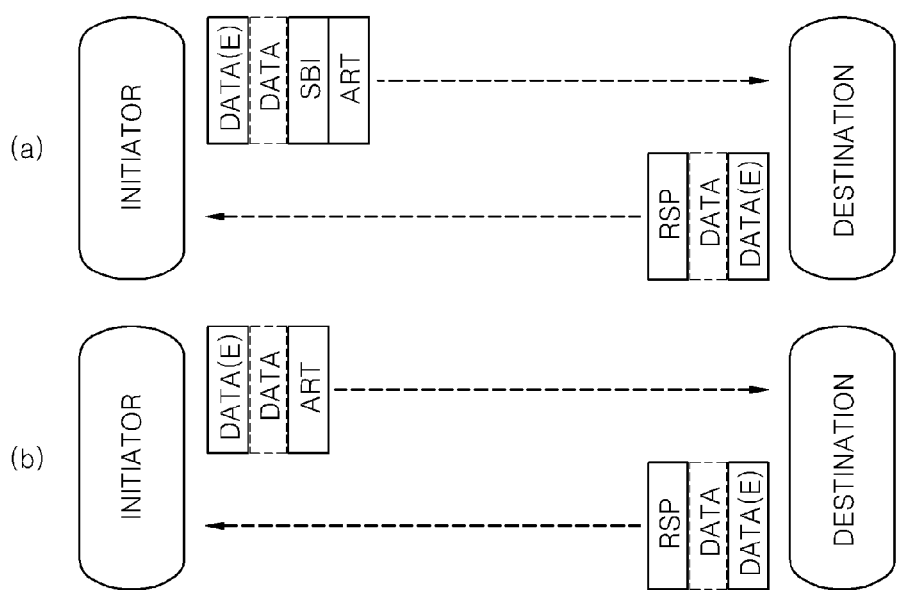
Figure 11:
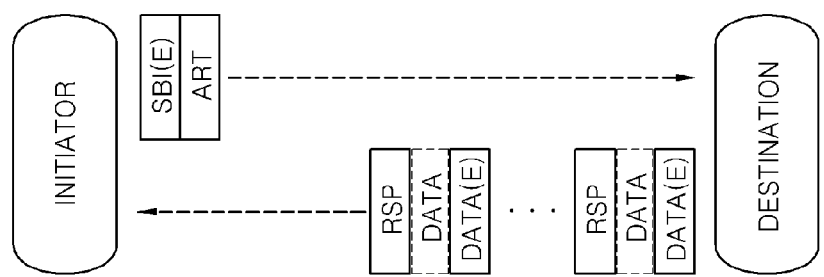

FIGS. 9 to 11 are diagrams illustrating examples of a regular read operation when RW is 0 and a regular read operation when RW is not 0 and an initiator requests the split transfer. In the case illustrated in FIG. 9(a), since RW is 0, a transfer packet containing ART and SBI(E) commands is transferred from the initiator to the destination, and a response packet containing RSP and DATA command is transferred from the destination to the initiator. Here, the SBI(E) command and a DATA(E) command indicate a case in which E is 1, i.e., indicate an end of the packet.

In the case illustrated in FIG. 9(b), since the destination is SBI-locked, a transfer packet does not contain SBI, and the destination uses an SBI value stored in previous transfer. In this case, the ARTO instruction in which only the address is transferred as illustrated in FIG. 7 is used in the transfer packet, and the response packet is created in the form of a 64-bit response signal padded with 0. Since the SBI is not transferred, a transfer cycle is reduced and network efficiency is increased.

As illustrated in FIG. 10, when RW is not 0, a write-after-read operation is performed, a DATA command is contained in the transfer packet, and data are transferred to both the destination and the initiator. In this case, the packet begins with an ART command and ends with a DATA(E) command, as illustrated in FIG. 10(a). Also, in the SBI-lock state, a packet beginning with the ART command and having no SBI command as illustrated in FIG. 10(b) is transferred.

In the regular transfer, a split response request is possible in which a response is split into several packets and transferred in response to one read transfer request or a write transfer request in which RW is not 0, as described above. When the initiator requests the split response, i.e., when RBL is not 0, a response is split into a maximum of eight packets and transferred as illustrated in FIG. 11, and another response or transfer request may be inserted between the packets as long as QoS is guaranteed.

Figure 12:
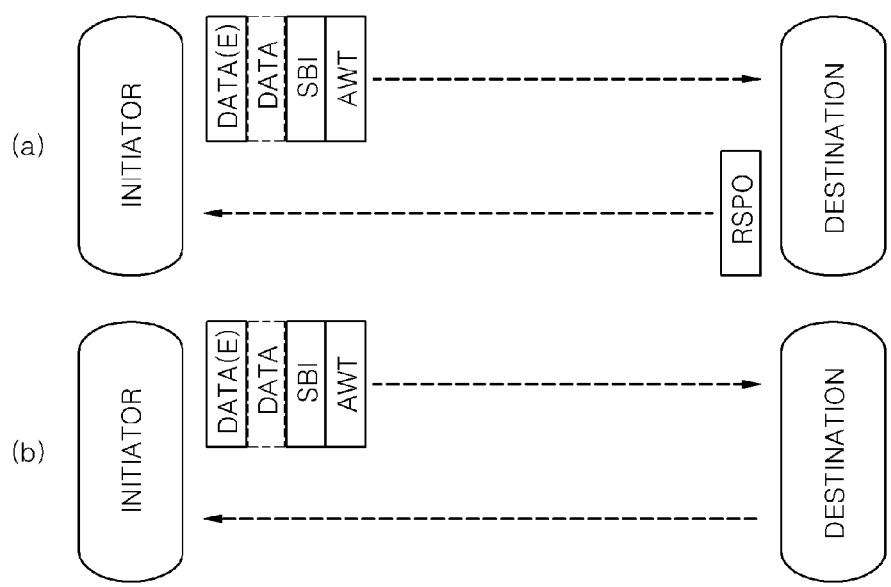
FIGS. 12 to 15 are diagrams illustrating examples of a regular write operation in a case in which SBI is contained when RW is 0, a case in which a transfer mode is SBI-lock when RW is 0, and a case in which RW is not 0.
Figure 13:
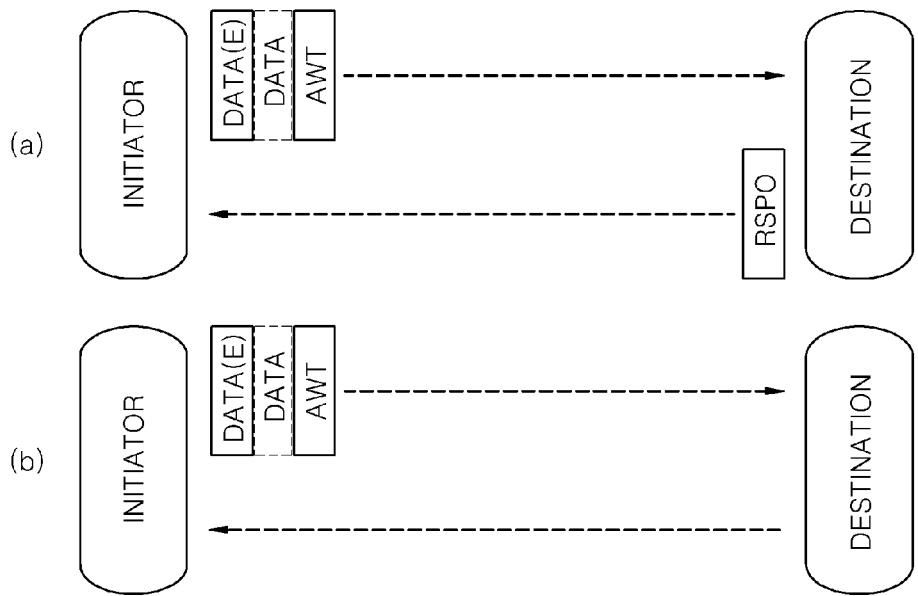

FIGS. 12 to 15 are diagrams illustrating examples of regular write operations in a case in which the SBI is contained when RW is 0, a case in which a transfer mode is an SBI-lock mode when RW is 0, and a case in which RW is not 0. FIG. 12 illustrates the regular write operation in which RW is 0 and SBI is contained in the transfer packet. When REQRSP is 1, a response packet containing a RSPO command is transferred as illustrated in FIG. 12(a). On the other hand, when REQRSP is 0, a response packet is not transferred, as illustrated in FIG. 12(b). FIG. 13 illustrates a case in which RW is 0 and the transfer mode is SBI-lock. A transfer packet containing only AWT and DATA commands without the SBI is transferred, as in the read operation. In FIG. 13(a), the response packet is transferred since REQRSP is 1. On the other hand, in FIG. 13(b), the response packet is not transferred since REQRSP is 0.

Figure 14:
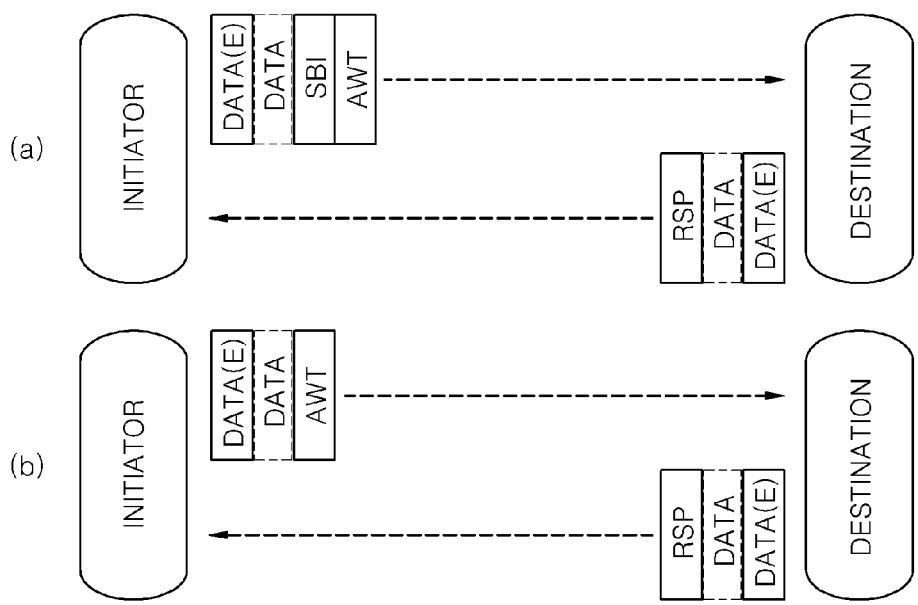
Figure 15:
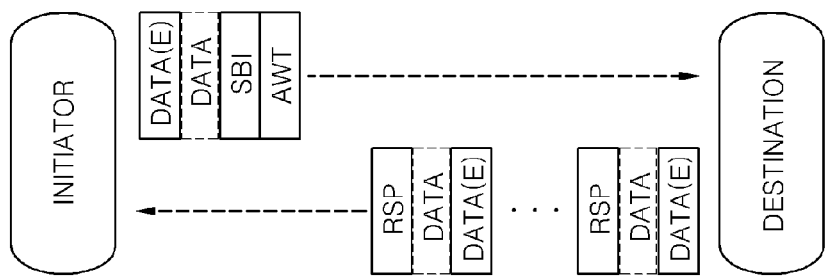

FIG. 14 illustrates a case in which RW is not 0 and a read-after-write operation is performed. Accordingly, a DATA command is contained in both a transfer packet and a response packet. FIG. 14(a) illustrates a case in which a packet contains SBI, and FIG. 14(b) illustrates a case in which a transfer mode is SBI-lock. As illustrated in FIG. 15, even in a write operation, a split response may be transferred from a destination when RW is not 0.

Figure 16:
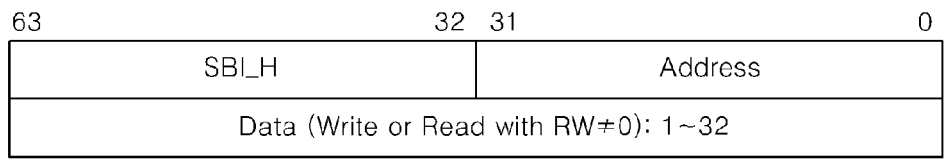
FIGS. 16 and 17 are diagrams illustrating a transfer packet used in SBI32 mode transfer.
Figure 17:
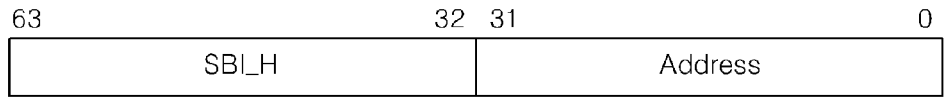
Figure 18:
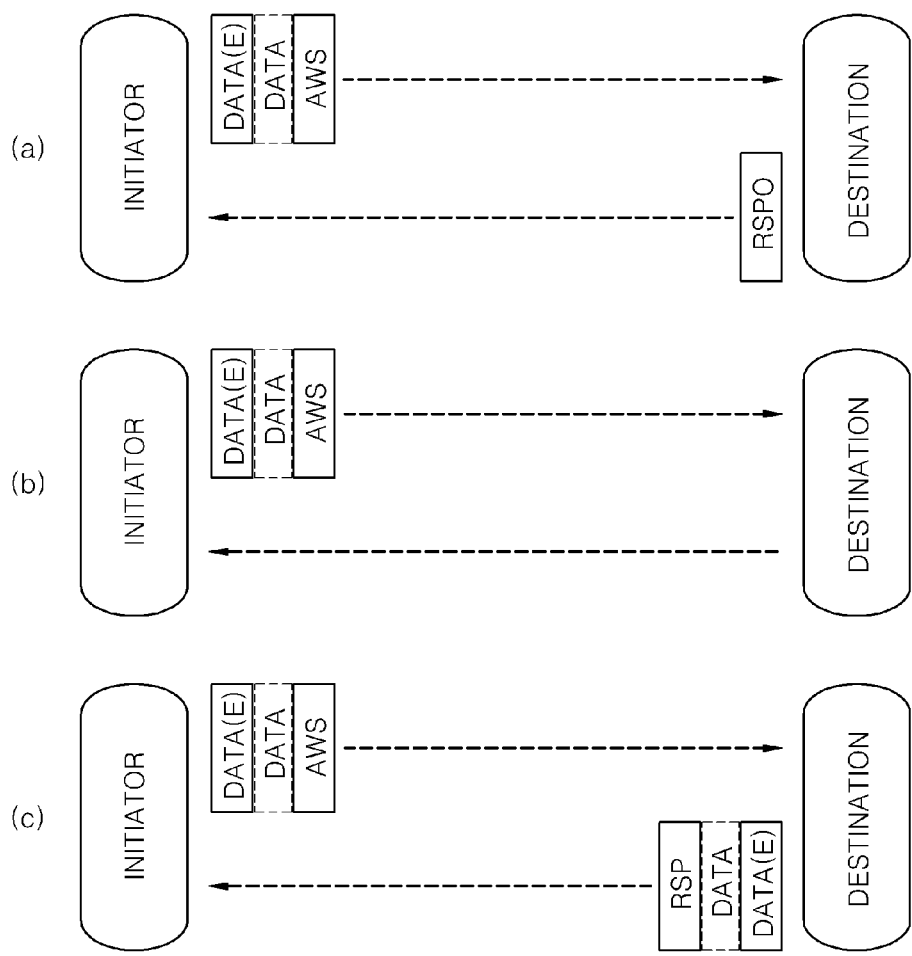
FIGS. 18 and 19 are diagrams illustrating examples of a write operation and a read operation in an SBI32 mode, respectively.
Figure 19:
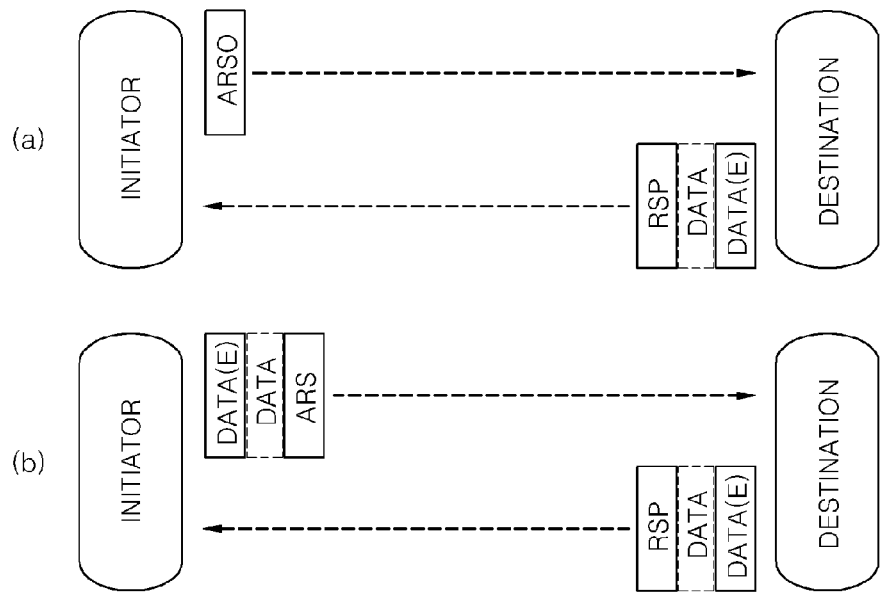

When an address has 32 bits and the SBI64 mode is not necessary, SBI32 mode transfer is performed. FIGS. 16 and 17 are diagrams illustrating a transfer packet used in SBI32 mode transfer. FIGS. 18 and 19 are diagrams illustrating examples of a write operation and a read operation in the SBI32 mode, respectively.

FIG. 16 illustrates a transfer packet when RW is not 0. Both the transfer packet and the response packet contain data, as in regular transfer. In this case, an address and SB_LH in the transfer packet are delivered together with an AWS or ARS command, followed by 64-bit data. Even when a 32-bit address is used, the regular transfer scheme is used when the function of the SBI64 mode is necessary. FIG. 17 illustrates a transfer packet for a read operation when RW is 0. Since data need not be transferred, the transfer packet containing only an address and SBI_H is transferred using the ARSO command.

FIG. 18 is a diagram illustrating a write operation in the SBI32 mode. As illustrated in FIG. 18(a), when REQRSP is 1 and RW is 0, data are contained only in the transfer packet, and only an RSPO command is contained in the response packet. FIG. 18(b) illustrates a write operation in which REQRSP is 0 and RW is 0. In this case, the response packet is not transferred. FIG. 18(c) illustrates a case in which RW is not 0. It can be seen that data are contained in both the transfer packet and the response packet.

FIG. 19 is a diagram illustrating a read operation in the SBI32 mode. When RW is 0, only an ARSO command and SBI_H are transferred and data are contained in a response packet, as illustrated in FIG. 19(a). Also, when RW is not 0, data are contained in both the transfer packet and the response packet, as illustrated in FIG. 19(b).

Thus, when the SBI32 mode is used, the address and the SBI are transferred together, thus suppressing increase in a transfer cycle due to the SBI transfer and improving transfer performance. Also, in the case of the SBI32 mode, a 32-bit address is used, but the lower 2 bits of SBI_H correspond to a reserved field, thus allowing the extension of an address value. Accordingly, a memory area of 16 GB can be managed using an address of a maximum of 34 bits. However, in the SBI32 mode, functions included in SBI_L are not available.

Figure 20:
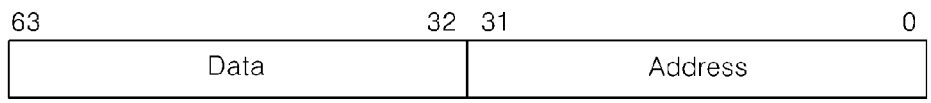
FIGS. 20 and 21 are diagrams illustrating a transfer packet and a response packet in single data transfer, respectively.
Figure 21:
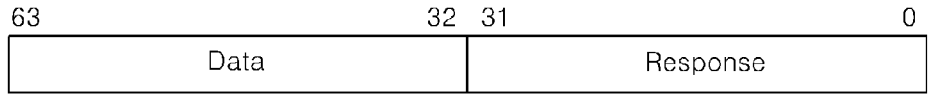
Figure 22:
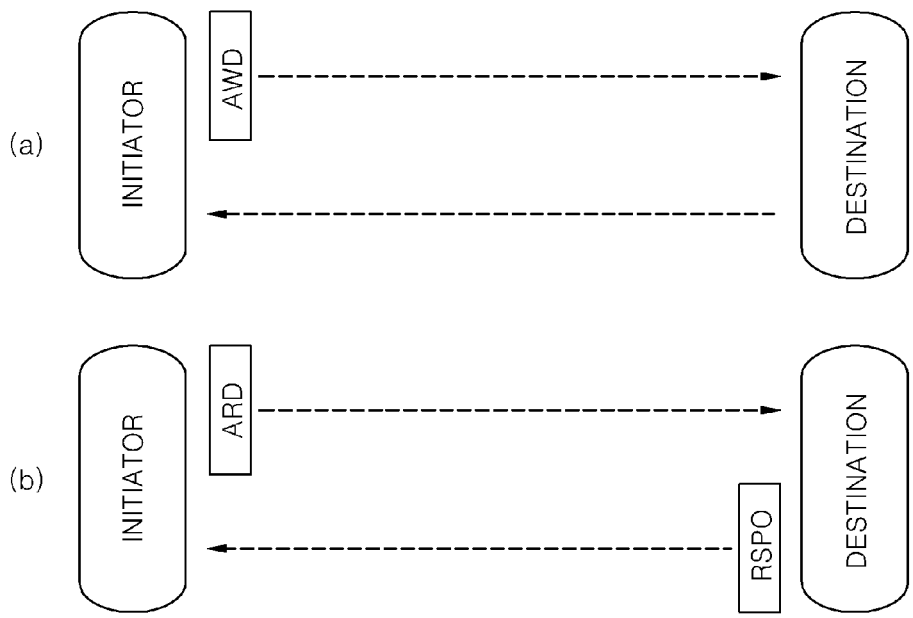
FIG. 22 is a diagram illustrating an example of a write and read operation in single data transfer.

Single data transfer (SDT) that is a third transfer scheme is used to transfer single 32-bit data. FIGS. 20 and 21 are diagrams illustrating a transfer packet and a response packet based on SDT, respectively. FIG. 22 is a diagram illustrating an example of write and read operations based on SDT. In the write operation, data are arranged in 32 upper bits, and an address is arranged in 32 lower bits, as illustrated in FIG. 20. In this case, since SBI is not transferred, LID cannot be known. Accordingly, a response packet is not transferred as illustrated in FIG. 22(a).

However, when a response is necessarily required, a response request may be made using the fact that the 2 lower bits of the address are not used since BSIZ is 2. When a value of the 2 lower bits of the address is 0, this indicates that the response is unnecessary. However, when a value of the 2 lower bits of the address is 1, 2 or 3, the 2 lower bits are used as an initiator code for identifying the initiator, and thus an LID value corresponding to each of the initiator codes is pre-defined for the three values in the destination, and a response is transferred to the initiator corresponding to the 2 lower bits of a transferred address.

That is, one destination may respond to SDT in the write operation with respect to a maximum of three initiators, and the initiator may store its allocated initiator code for a specific destination and request the response when necessary. Accordingly, in a write operation requiring no response, an address is necessarily aligned in units of 32 bits, and 2 lower bits should be set to 0. In the destination, the default value of SBI32 is used except for BLEN, BSIZ, and REQRSP, and default values for the three fields are set as BLEN=1, BSIZ=2, and REQRSP=0.

When a response is required in SDT of the write operation, an initiator and a destination that can perform such an operation are determined in advance, and the operation can be performed between the predefined initiator and the predefined destination. Also, since there is no TID, a next transfer request cannot be made until a response is received after a transfer request. Such a function is intended to be used for internal communication in a sub-network including three or four IPs. Accordingly, when this function is used over an entire network, system design is complicated and one transfer cycle is additionally required. However, it is desirable to restrictively use this function only when the function is necessarily required since the same function can be implemented using an AWS command.

In a read operation, SBI_H is arranged in 32 upper bits and the address is arranged in 32 lower bits, similar to the transfer packet in an SBI32 mode read operation illustrated in FIG. 17, but an RSPD command is contained in a response packet as illustrated in FIGS. 21 and 22(b) and both a response signal and 32-bit data are transferred together. In a read operation in SDT, although SBI_H is contained, a changeable control information signal is limited due to the characteristic of SDT.

According to SDT, single 32-bit data can be quickly transferred within a 32-bit address area of a 64-bit address system or a 32-bit address system. That is, data are quickly transferred in one transfer cycle, thus maximizing transfer efficiency. This function is used when a destination IP should be reconfigured or a parameter should be quickly transferred. When two or more data are necessary, SDT may be continuously performed two times or more. However, when there are four or more data or when the destination should re-transfer a result value to the initiator after write transfer, it is advantageous to use an AWS command or an ARS command.

In the USIP, last data are transferred together with the DATA(E) command. Accordingly, if the last data are transferred together with the DATA(E) command using an unspecified burst length or a determined burst length having an appropriate size when the initiator cannot predict the burst length in advance, the transfer is terminated. Thus, early termination is possible.

Figure 23:
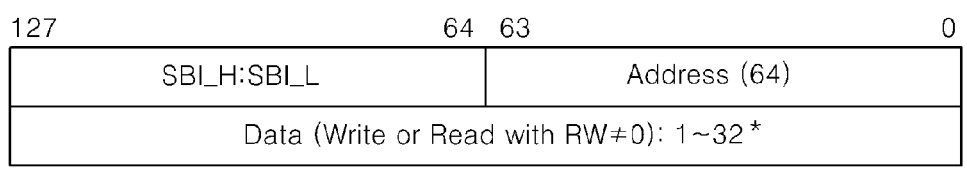
FIGS. 23 and 24 are diagrams illustrating transfer packets used in extended transfers.
Figure 24:
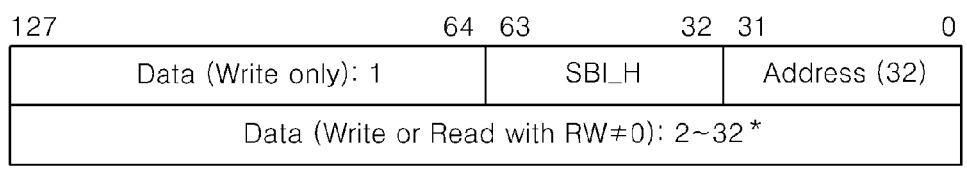

Meanwhile, when the channel width is extended to 128 bits or more, extended transfer is possible. FIGS. 23 and 24 are diagrams illustrating a transfer packet used in the extended transfer. Referring to FIG. 23, in the extended transfer, the AWT or ART command is transferred with a 128-bit signal containing 64-bit SBI and a 64-bit address in the regular transfer. Referring to FIG. 24, in the SBI32 mode, first data are contained in 64 upper bits with AWS or ARS command and 128-bit data are then transferred together with a DATA.

Figure 25:
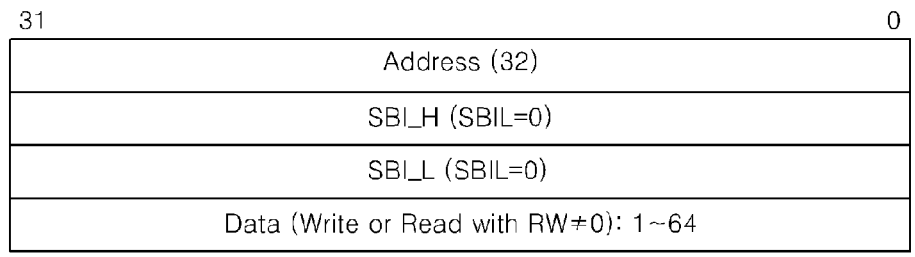
FIG. 25 is a diagram illustrating a regular transfer packet used in a 32-bit channel when an address has 32 bits or less.

On the other hand, when the channel width is reduced to 32 bits or less and the address has 32 bits or less, it is not necessary to extend the address. FIG. 25 is a diagram illustrating a regular transfer packet used in a 32-bit channel when the address has 32 bits or less.

Figure 26:
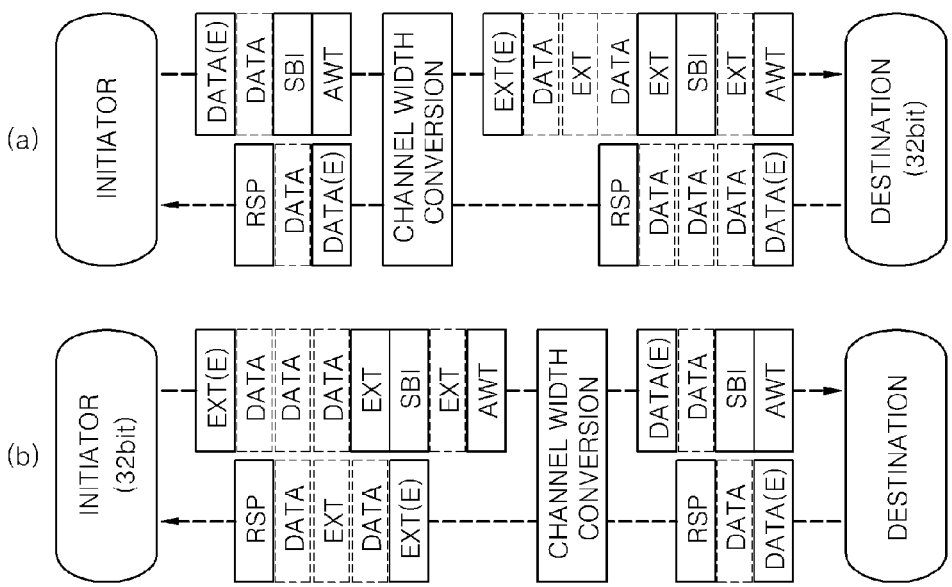
FIGS. 26 and 27 are diagrams illustrating an example in which regular write communication and SBI32 mode write communication are performed between IPs having different channel widths.
Figure 27:
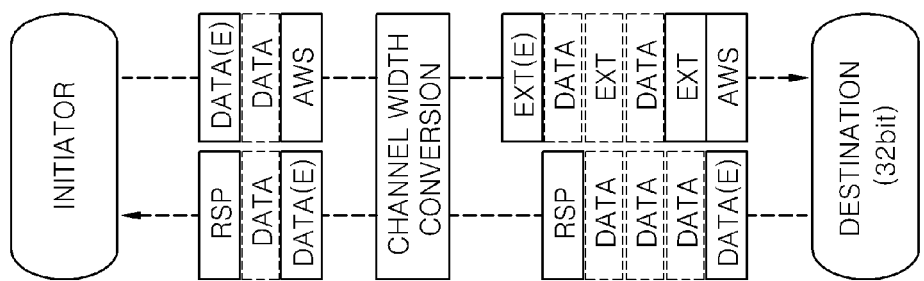

FIGS. 26 and 27 are diagrams illustrating examples in which regular write communication and SBI32 mode write communication are performed between IPs having different channel widths. Referring first to FIG. 26, when a 64-bit initiator communicates with a 32-bit destination as illustrated in FIG. 26(a), a transfer packet of the initiator is split in a 32-bit channel using an EXT command. In this case, an address is omitted instead of being extended when its 32 upper bits are all 0. Data transferred together with the DATA (E) command is accompanied by DATA-EXT(E) commands while being split into two data. That is, in the case of the last 64 bits, upper 32-bit data are transferred together with the DATA command, and lower 32-bit data are transferred together with an EXT(E) command. In EXT(E), E is 1, which indicates the end of a packet.

In the case of the response packet, since a response signal transferred together with an RSP command has 32 bits, the response packet need not be extended by the EXT command. Accordingly, the response packet is created with no EXT command and transferred together with the DATA command, with RSP padded with 0 for a 64-bit channel and the data collected in units of 64 bits.

When the initiator has 32 bits and the destination has 64 bits as illustrated in FIG. 26(b), a 64-bit address and SBI are extended by an EXT command, and data are packetized in units of 32 bits. Also, when the address consists of 32 bits, a packet is transferred with no EXT command. The transferred transfer packet is converted to a 64-bit packet when reaching the destination, and in this case, the EXT command is removed. The packet is padded with 0 in the case of a 32-bit address. When a 64-bit response packet transferred from the destination reaches the initiator, data are extended to a 32-bit packet using an EXT command.

Next, referring to FIG. 27, the SBI32 mode differs from regular transfer only in that there is no SBI command. In other words, when a 64-bit initiator communicates with a 32-bit destination, a transfer packet transferred from the initiator contains no EXT command, and is converted to contain the EXT command when reaching a destination channel.

When a 64-bit packet is converted to a 32-bit packet, each of AWT and AWS commands is transferred by 32 bits twice. 32 upper bits are first transferred together with the AWT or AWS command and then 32 lower bits are transferred together with the EXT command. Thus, the destination collects the transferred data to be 64 bits and appropriately analyzes the data. In this case, the AWT and AWS commands are split into 32 bits in different schemes. In the case of the AWT command, 32 upper bits are accompanied by the AWT command. In the case of the AWS command, 32 lower bits corresponding to an address value are accompanied by the AWS command. This allows an address to be arranged at the front of a packet because internal routing is generally performed based on the address, and allows upper bits to be arranged at the front when an address has 64 bits, thus reducing a routing cycle.

However, in the regular transfer, when a 32-bit address space is used, all 32 upper bits are not transferred since all the bits are 0, but 32 lower bits are immediately transferred. Thus, when the 64-bit address system is used, an address area in which 32 upper bits are 0 may not be used or may be used for a special purpose.

Conversely, in the regular write transfer, when the channel is converted to 128 bits or more, a transfer scheme is converted to the extended transfer in which a 64-bit address and 64-bit SBI are collected as one and SBI and data are collected as one by the AWS command in the SBI32 mode.

As described above, the USIP of the present invention uses the PID that guarantees compatibility with an IP based on a different protocol interface for IP recycling. When there are only two protocols, a protocol conversion is possible to some extent even though performance is degraded. However, when there are three or more protocols, a protocol converter receives a signal that has been converted once, making it difficult to analyze the signal. In this case, communication itself may be disabled or performance may be greatly degraded.

Accordingly, a protocol used by IP that has first generated a signal can be recognized from a PID value of SBI. Additional information necessary for a protocol conversion can be provided using a reserved field of SBI, if necessary. Since information of the reserved field has a different meaning according to the PID, more information can be delivered using a small number of bits. Accordingly, a system designer can assign the PID, and define an unused field of the SBI to deliver necessary information according to the PID, if necessary, to thereby design a system for most efficient communication after analyzing protocols included in the system.

When there are IPs based on a variety of protocols, each IP delivers a signal through the protocol converter, and an interface of the protocol converter on the network side uses the protocol of the present invention. Accordingly, it is impossible to know a protocol used by the other party IP in communication. The PID provides information on a protocol used by the other party IP so that an appropriate action is taken. For example, when an AXI-based IP communicates with an AHB-based IP, the AHB-based IP cannot initiate a next transfer until receiving a response to the transfer request. Accordingly, rapid transfer of the response can prevent performance degradation in an entire system. Also, when a user does not desire to use the reserved field, a function not understood by the AHB-based IP is not used for smooth communication.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of carrier waves (e.g., Internet transmission). In addition, the computer readable record medium may be distributed to computer systems over a network, in which computer readable codes may be stored and executed in a distributed manner.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A network protocol for data transfer between an initiator that is an interface initiating communication over a network and a destination that is an interface responding to the communication initiation of the initiator, wherein:

a command signal containing an instruction is transferred via a channel between the initiator and the destination, the instruction defining a meaning and a characteristic of information contained in a transfer signal transferred from the initiator to the destination via a channel or in a response signal transferred from the destination via the channel, a most significant bit of the command signal indicates a priority corresponding to a transaction between the initiator and the destination in the network when the instruction contained in the command signal corresponds to the first transfer signal transmitted via the channel, and indicates whether the transfer signal is a last transfer signal transferred between the initiator and the destination when the instruction contained in the command signal corresponds to the transfer signal following the first transfer signal that a highest priority is assigned to a transaction between the initiator and the destination in the network when the instruction contained in the command signal corresponds to address information contained in the transfer signal and response information contained in the response signal, and indicates last data of a signal transferred between the initiator and the destination when the instruction contained in the command signal corresponds to control information contained in the transfer signal and data contained in the transfer signal and the response signal, the control information contained in the transfer signal further includes a priority field, and a priority of the transaction is determined based on a value obtained by combining the most significant bit of the command signal and the priority field.

2. The network protocol of claim 1, wherein:

the control information contained in the transfer signal and the response information contained in the response signal include a plurality of fields including a protocol information field, and a value of the protocol information field is assigned by a protocol converter as a unique identification code for a different protocol used by the initiator and the destination when the initiator and the destination use the different protocols.

3. A network protocol for data transfer between an initiator that is an interface initiating communication over a network and a destination that is an interface responding to the communication initiation of the initiator, wherein:

a command signal containing an instruction is transferred via a channel between the initiator and the destination, the instruction defining a meaning and a characteristic of information contained in a transfer signal transferred from the initiator to the destination via the channel or in a response signal transferred from the destination via the channel, a most significant bit of the command signal indicates that a highest priority is assigned to a transaction between the initiator and the destination in the network when the instruction contained in the command signal corresponds to address information contained in the transfer signal and response information contained in the response signal, and indicates last data of a signal transferred between the initiator and the destination when the instruction contained in the command signal corresponds to control information contained in the transfer signal and data contained in the transfer signal and the response signal, the control information and the response information further include a simultaneous read and write field, and when a value of the simultaneous read and write field is not 0, the destination performs both a read operation and a write operation in response to one transfer signal transferred from the initiator.

4. The network protocol of claim 3, wherein:

a control information contained in the transfer signal and a response information contained in the response signal further include a simultaneous read and write field, and when a value of the simultaneous read and write field is not 0, the destination performs both a read operation and a write operation in response to one transfer signal transferred from the initiator.

5. The network protocol of claim 3, wherein:

the control information contained in the transfer signal further includes a delay response field, and when the delay response field is not 0, the destination transfers a response signal corresponding to the transfer signal after a previously set response condition is satisfied.

6. The network protocol of claim 3, wherein:

the control information contained in the transfer signal further includes a lock type field and a control information lock field, and when a first transfer signal in which a value of the lock type field is set to a value indicating lock of the control information and a value of the control information lock field is not 0 is transferred and then a second transfer signal with no control information is transferred from an initiator transferring the first transfer signal, control information of the second transfer signal is set to have the same field values as the control information contained in the first transfer signal.

7. The network protocol of claim 6, wherein:

the response information contained in the response signal further includes a response field, and when a transfer signal in which the value of the control information lock field is not 0 is transferred from a second initiator other than a first initiator transferring a transfer signal in which the value of the control information lock field is not 0, a value of a response field contained in a response signal transferred to the second initiator is set to a value indicating a control information lock error.

8. The network protocol of claim 6, wherein: when a third transfer signal which contains the control information and whose value of the lock type field is not a value indicating lock of the control information is transferred from the initiator transferring the first transfer signal or another initiator, a response signal corresponding to the third transfer signal transferred from the destination is generated based on the control information contained in the third transfer signal, and the control information of the second transfer signal transferred after the third transfer signal is set to have the same field values as the control information contained in the first transfer signal.

9. The network protocol of claim 3, wherein:

the control information contained in the transfer signal further includes a split response field, the response signal is split into a plurality of split response signals having lengths corresponding to a value of the split response field and is transferred, when the value of the split response field is not 0, the response signal is split into a plurality of split response signals having lengths corresponding to a value of a burst length field of the response information contained in the response signal, and when the value of the split response field is 0, the response signal is not transferred as the split response signals or is transferred as split response signals having a burst length set by the destination.

10. The network protocol of claim 9, wherein the response information contained in the response signal further includes a split identification field for identifying the plurality of split response signals.

11. The network protocol of claim 9, wherein: when the transfer signal is relevant to a write operation, the value of the burst length field is set to be the same as a burst length of data transferred by the transfer signal.

12. The network protocol of claim 3, wherein:

the control information contained in the transfer signal further includes an initiator identification field indicating an identification code of a port to which the initiator is connected, and a value of the initiator identification field is set by the network when data are transferred from the initiator using an address value of the destination and by the initiator when the data are transferred from the initiator using a network coordinate of the destination.

13. The network protocol of claim 3, wherein:

the control information contained in the transfer signal further includes an align field, and when a value of the align field is not 0, data are sequentially aligned and transferred from a first byte lane in a case in which a nonalignment scheme is supported for the address information.

14. The network protocol of claim 3, wherein:

the transfer signal and the response signal are sequentially transferred in the form of packets containing the address information, the response information, and the control information, when the address information contained in the transfer signal is address information for a write operation, a packet containing data as a target of the write operation is additionally transferred in the transfer signal, when the address information contained in the transfer signal is address information for a read operation, a packet containing data obtained by the read operation is additionally transferred in the response signal, and a command signal containing an instruction defining information contained in each packet is transferred simultaneously with the transfer of the packet.

15. The network protocol of claim 3, wherein:

when a length of the address information contained in the transfer signal corresponds to half of a width of the channel, the transfer signal is transferred in the form of a packet containing both the address information and the control information, when the address information contained in the transfer signal is address information for a write operation, a packet containing data as a target of the write operation is additionally transferred, and a command signal containing an instruction defining information contained in each packet is transferred simultaneously with the transfer of the packet.

16. The network protocol of claim 3, wherein, when the address information contained in the transfer signal is address information for a write operation and a length of data as a target of the write operation corresponds to half of a width of the channel, the transfer signal is transferred in the form of a packet containing both the address information and the data, and a value of the control information contained in the transfer signal is set as a default value that has been set in advance.

17. The network protocol of claim 16, wherein the control information contained in the transfer signal contains a plurality of fields containing an initiator identification field indicating an identification code of a port to which the initiator is connected, and when a value of the initiator identification field corresponding to an initiator code contained in the address information is stored in the destination in advance, the response signal is transferred to an initiator transferring a transfer signal containing the initiator code.

* * * * *